United States Patent
Rathay et al.

(10) Patent No.: US 11,427,330 B2
(45) Date of Patent: Aug. 30, 2022

(54) SYSTEM AND METHOD FOR COOLING A LEADING EDGE OF A HIGH SPEED VEHICLE

(71) Applicant: General Electric Company, Schenectady, NY (US)

(72) Inventors: Nicholas William Rathay, Rock City Falls, NY (US); Gregory Alexander Natsui, Schenectady, NY (US); Brian Magann Rush, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 241 days.

(21) Appl. No.: 16/685,541

(22) Filed: Nov. 15, 2019

(65) Prior Publication Data
US 2021/0147086 A1    May 20, 2021

(51) Int. Cl.
*B64D 13/00*     (2006.01)
*B64C 30/00*     (2006.01)
*F28F 21/00*     (2006.01)
*B64C 1/10*      (2006.01)

(52) U.S. Cl.
CPC ............. *B64D 13/00* (2013.01); *B64C 1/10* (2013.01); *B64C 30/00* (2013.01); *F28F 21/00* (2013.01)

(58) Field of Classification Search
CPC ........... B64D 13/006; B64C 1/38; B64C 3/36; B64C 30/00
See application file for complete search history.

(56) References Cited

U.S. PATENT DOCUMENTS

| | | | |
|---|---|---|---|
| 2,451,692 A | 10/1948 | Pugh | |
| 3,064,317 A | 11/1962 | Dobson | |
| 3,119,333 A | 1/1964 | Loughran | |
| 3,151,712 A | 10/1964 | Jackson | |
| 3,267,857 A * | 8/1966 | Lindberg, Jr. | B64G 1/58 244/159.1 |
| 3,731,893 A | 5/1973 | Stalmach, Jr. | |
| 3,777,975 A | 12/1973 | Kofink | |

(Continued)

FOREIGN PATENT DOCUMENTS

CN    1201704 A    12/1998
CN    104776740 A    7/2015
(Continued)

OTHER PUBLICATIONS

U.S. Appl. No. 16/271,220, filed Feb. 8, 2019.
(Continued)

*Primary Examiner* — Richard R. Green
*Assistant Examiner* — Colin Zohoori
(74) *Attorney, Agent, or Firm* — Dority & Manning, P.A.

(57) ABSTRACT

A hypersonic aircraft includes one or more leading edge assemblies that are designed to manage thermal loads experienced at the leading edges during high speed or hypersonic operation. Specifically, the leading edge assemblies may include an outer wall tapered to a leading edge or stagnation point. The outer wall may define a vapor chamber and a capillary structure within the vapor chamber for circulating a working fluid in either liquid or vapor form to cool the leading edge. In addition, a thermal energy storage reservoir positioned within the vapor chamber contains a phase change material for absorbing thermal energy.

18 Claims, 6 Drawing Sheets

(56) References Cited

U.S. PATENT DOCUMENTS

| | | |
|---|---|---|
| 3,785,591 A | 1/1974 | Stalmach, Jr. |
| 3,808,833 A | 5/1974 | Allen et al. |
| 3,883,096 A | 5/1975 | Osofsky |
| 4,014,485 A | 3/1977 | Kinnaird et al. |
| 4,203,489 A | 5/1980 | Swiadek |
| 4,344,591 A | 8/1982 | Jackson |
| 4,671,348 A | 6/1987 | Bauer |
| 4,700,773 A | 10/1987 | Kehrer |
| 4,771,365 A | 9/1988 | Chichocki et al. |
| 4,915,164 A | 4/1990 | Harper |
| 4,924,228 A | 5/1990 | Novak et al. |
| 4,966,229 A | 10/1990 | Senterfitt et al. |
| 5,227,957 A | 7/1993 | Deters |
| 5,257,757 A | 11/1993 | Paul et al. |
| 5,283,715 A | 2/1994 | Carlsten et al. |
| 5,291,830 A | 3/1994 | Zwan |
| 5,299,762 A | 4/1994 | Kosson et al. |
| 5,343,632 A | 9/1994 | Dinh |
| 5,351,917 A | 10/1994 | Bulman |
| 5,439,351 A | 8/1995 | Artt |
| 5,452,866 A | 9/1995 | Bulman |
| 5,579,830 A | 12/1996 | Giammaruti |
| 5,647,429 A | 7/1997 | Oktay et al. |
| 5,720,339 A | 2/1998 | Glass et al. |
| 5,761,909 A | 6/1998 | Hughes et al. |
| 5,899,265 A | 5/1999 | Schneider et al. |
| 5,975,841 A | 11/1999 | Lindemuth et al. |
| 6,164,061 A | 12/2000 | Chevalier et al. |
| 6,233,150 B1 | 5/2001 | Lin et al. |
| 6,260,613 B1 | 7/2001 | Pollard |
| 6,301,332 B1 | 10/2001 | Rogers et al. |
| 6,359,218 B1 | 3/2002 | Koch et al. |
| 6,360,813 B1 | 3/2002 | Katoh et al. |
| 6,367,740 B1 | 4/2002 | Johnson et al. |
| 6,378,605 B1 | 4/2002 | Kutscher et al. |
| 6,392,883 B1 | 5/2002 | Ali |
| 6,430,931 B1 | 8/2002 | Horner |
| 6,478,257 B1 | 11/2002 | Oh et al. |
| 6,624,349 B1 | 9/2003 | Bass |
| 6,631,755 B1 | 10/2003 | Kung et al. |
| 6,678,159 B1 | 1/2004 | Barcley |
| 6,889,755 B2 | 5/2005 | Zuo et al. |
| 6,983,790 B2 | 1/2006 | Ippoushi et al. |
| 6,994,152 B2 | 2/2006 | Rosenfeld et al. |
| 7,002,247 B2 | 2/2006 | Mok et al. |
| 7,007,741 B2 | 3/2006 | Sen et al. |
| 7,032,654 B2 | 4/2006 | Wand et al. |
| 7,086,247 B2 | 8/2006 | Campbell et al. |
| 7,128,532 B2 | 10/2006 | Petervary et al. |
| 7,189,064 B2 | 3/2007 | Helder et al. |
| 7,232,093 B2 | 6/2007 | Behrens et al. |
| 7,256,992 B1 | 8/2007 | Stewart et al. |
| 7,369,410 B2 | 5/2008 | Chen et al. |
| 7,377,098 B2 | 5/2008 | Walker et al. |
| 7,473,995 B2 | 1/2009 | Rumer et al. |
| 7,594,537 B2 | 9/2009 | Hou et al. |
| 7,686,248 B2 | 3/2010 | Weber et al. |
| 7,704,565 B2 | 4/2010 | Slaughter |
| 7,768,783 B1 | 8/2010 | Kajiya et al. |
| 7,859,844 B2 | 12/2010 | Nguyen et al. |
| 7,871,578 B2 | 1/2011 | Schmidt |
| 7,900,438 B2 | 3/2011 | Venkataramani et al. |
| 7,907,409 B2 | 3/2011 | Wyatt et al. |
| 7,928,562 B2 | 4/2011 | Arvelo et al. |
| 7,942,025 B1 | 5/2011 | Musone |
| 8,047,269 B2 | 11/2011 | Kang et al. |
| 8,109,324 B2 | 2/2012 | Farid et al. |
| 8,176,972 B2 | 5/2012 | Mok |
| 8,323,122 B2 | 12/2012 | Soracco et al. |
| 8,424,203 B2 | 4/2013 | dos Santos e Lucato |
| 8,464,535 B2 | 6/2013 | White et al. |
| 8,466,486 B2 | 6/2013 | Yuan |
| 8,475,112 B1 | 7/2013 | Ryznic et al. |
| 8,549,749 B2 | 10/2013 | Zimbeck et al. |
| 8,610,761 B2 | 12/2013 | Haisty et al. |
| 8,616,834 B2 | 12/2013 | Knight, III et al. |
| 8,656,722 B2 | 2/2014 | Norris et al. |
| 8,678,316 B2 | 3/2014 | Rawlings et al. |
| 8,684,310 B2 | 4/2014 | Rawlings et al. |
| 8,844,877 B1 | 9/2014 | Driemeyer et al. |
| 8,934,235 B2 | 1/2015 | Rubenstein et al. |
| 8,937,384 B2 | 1/2015 | Bao et al. |
| 9,475,593 B2 | 10/2016 | Pinney et al. |
| 9,476,651 B2 | 10/2016 | Thiagrarajan et al. |
| 9,516,791 B2 | 12/2016 | Chester et al. |
| 9,913,411 B2 | 3/2018 | De Bock et al. |
| D818,093 S | 5/2018 | Emo et al. |
| 9,974,157 B2 | 5/2018 | de Bock et al. |
| 10,173,780 B2 | 1/2019 | Mackin et al. |
| 10,209,009 B2 | 2/2019 | Gerstler et al. |
| 10,356,945 B2 | 7/2019 | Rush et al. |
| 10,386,127 B2 | 8/2019 | Rush et al. |
| 2002/0021556 A1 | 2/2002 | Dibene et al. |
| 2002/0144811 A1 | 10/2002 | Chou et al. |
| 2003/0043547 A1 | 3/2003 | Nealis et al. |
| 2004/0011503 A1 | 1/2004 | Kung et al. |
| 2004/0129032 A1 | 7/2004 | Severns et al. |
| 2005/0103473 A1 | 5/2005 | Todd et al. |
| 2005/0207120 A1 | 9/2005 | Tseng et al. |
| 2006/0060328 A1 | 3/2006 | Ewes et al. |
| 2006/0140346 A1 | 6/2006 | McCarthy |
| 2006/0145020 A1 | 7/2006 | Buehler |
| 2007/0012429 A1 | 1/2007 | Siu |
| 2007/0017659 A1 | 1/2007 | Brunschwiler et al. |
| 2007/0151708 A1 | 7/2007 | Touzov |
| 2007/0247813 A1 | 10/2007 | Colbert et al. |
| 2008/0149299 A1 | 6/2008 | Slaughter |
| 2008/0170368 A1 | 7/2008 | Chen et al. |
| 2008/0235977 A1 | 10/2008 | Kuwabara |
| 2009/0040726 A1 | 2/2009 | Hoffman et al. |
| 2009/0090109 A1 | 4/2009 | Mills et al. |
| 2009/0151900 A1 | 6/2009 | Huang |
| 2009/0244830 A1 | 10/2009 | Wyatt et al. |
| 2010/0051227 A1 | 3/2010 | Anbudurai |
| 2010/0065256 A1 | 3/2010 | Wilcoxon et al. |
| 2010/0109137 A1 | 5/2010 | Sasaki et al. |
| 2010/0170101 A1 | 7/2010 | Taniguchi et al. |
| 2010/0200199 A1 | 8/2010 | Habib et al. |
| 2010/0212656 A1 | 8/2010 | Qiu et al. |
| 2010/0236759 A1* | 9/2010 | Wadley .................. E04C 2/365 165/104.19 |
| 2010/0320187 A1 | 12/2010 | Griffin et al. |
| 2011/0016886 A1 | 1/2011 | Ghoshal et al. |
| 2011/0168159 A1 | 7/2011 | Lataperez et al. |
| 2011/0209864 A1 | 9/2011 | Figus et al. |
| 2011/0232877 A1 | 9/2011 | Meyer, IV et al. |
| 2011/0253344 A1 | 10/2011 | Kuhn et al. |
| 2011/0259041 A1 | 10/2011 | Kuehl et al. |
| 2011/0279969 A1 | 11/2011 | Memon |
| 2011/0279970 A1 | 11/2011 | Guan |
| 2012/0107662 A1 | 5/2012 | Roemmler et al. |
| 2012/0110869 A1 | 5/2012 | Bellinger et al. |
| 2012/0125573 A1 | 5/2012 | Rubenstein et al. |
| 2012/0155015 A1 | 6/2012 | Govindasamy et al. |
| 2012/0192574 A1 | 8/2012 | Ghoshal et al. |
| 2012/0206880 A1 | 8/2012 | Andres et al. |
| 2012/0227926 A1 | 9/2012 | Field et al. |
| 2012/0250259 A1 | 10/2012 | Lee et al. |
| 2012/0319410 A1 | 12/2012 | Ambrosek et al. |
| 2012/0331269 A1 | 12/2012 | Aras |
| 2013/0003307 A1 | 1/2013 | Jang |
| 2013/0008632 A1 | 1/2013 | Brunschwiler et al. |
| 2013/0056170 A1 | 3/2013 | Klemencic |
| 2013/0077245 A1 | 3/2013 | Gradinger et al. |
| 2013/0079693 A1 | 3/2013 | Ranky et al. |
| 2013/0098417 A1 | 4/2013 | Gavillet |
| 2013/0105122 A1 | 5/2013 | Campbell et al. |
| 2013/0107455 A1 | 5/2013 | Cottet et al. |
| 2013/0170142 A1 | 7/2013 | Weaver, Jr. et al. |
| 2013/0189594 A1 | 7/2013 | Breit et al. |
| 2013/0206374 A1 | 8/2013 | Rosin et al. |
| 2014/0014493 A1 | 1/2014 | Ryan |
| 2014/0037873 A1 | 2/2014 | Cheung et al. |
| 2014/0060771 A1 | 3/2014 | Bell et al. |

(56) References Cited

U.S. PATENT DOCUMENTS

| | | |
|---|---|---|
| 2014/0083653 A1 | 3/2014 | Kempers et al. |
| 2014/0090808 A1 | 4/2014 | Bessho et al. |
| 2014/0102662 A1 | 4/2014 | Grama et al. |
| 2014/0104787 A1 | 4/2014 | Chainer et al. |
| 2014/0150464 A1 | 6/2014 | Bloedow et al. |
| 2014/0154539 A1 | 6/2014 | Kwok et al. |
| 2014/0158334 A1 | 6/2014 | Dellea et al. |
| 2014/0163445 A1 | 6/2014 | Pallari et al. |
| 2014/0174086 A1 | 6/2014 | Kare et al. |
| 2014/0190667 A1 | 7/2014 | McGlen et al. |
| 2014/0233174 A1 | 8/2014 | Demange |
| 2014/0251585 A1 | 9/2014 | Kusuda et al. |
| 2014/0268831 A1 | 9/2014 | Shih et al. |
| 2014/0268969 A1 | 9/2014 | Crouch et al. |
| 2014/0284020 A1 | 9/2014 | Amir et al. |
| 2014/0321998 A1 | 10/2014 | Maar et al. |
| 2014/0334104 A1 | 11/2014 | Yang et al. |
| 2014/0340845 A1 | 11/2014 | Straznicky et al. |
| 2014/0362590 A1 | 12/2014 | Chen et al. |
| 2014/0368992 A1 | 12/2014 | Strader et al. |
| 2015/0000871 A1 | 1/2015 | Farmer et al. |
| 2015/0027669 A1 | 1/2015 | Kokas et al. |
| 2015/0040888 A1 | 2/2015 | Zakhidov et al. |
| 2015/0080495 A1 | 3/2015 | Heikkila |
| 2015/0237762 A1 | 8/2015 | Holt et al. |
| 2015/0289413 A1 | 10/2015 | Rush et al. |
| 2015/0366105 A1 | 12/2015 | Dunwoody et al. |
| 2016/0116218 A1 | 4/2016 | Shedd et al. |
| 2016/0124474 A1 | 5/2016 | So et al. |
| 2016/0202003 A1 | 7/2016 | Gerstler et al. |
| 2016/0305279 A1 | 10/2016 | Gerstler et al. |
| 2016/0319135 A1 | 11/2016 | Hecht |
| 2017/0064868 A1 | 3/2017 | Rush et al. |
| 2017/0067693 A1 | 3/2017 | Rush et al. |
| 2017/0167838 A1 | 6/2017 | Quertelet |
| 2017/0276440 A1 | 9/2017 | Kenworthy et al. |
| 2017/0363363 A1 | 12/2017 | Lassini et al. |
| 2018/0022439 A1 | 1/2018 | Stanley et al. |
| 2018/0057191 A1 | 3/2018 | Zhang et al. |
| 2018/0170553 A1* | 6/2018 | Wang .................... B64C 39/024 |
| 2018/0356794 A1 | 12/2018 | Wiedenhoefer et al. |

FOREIGN PATENT DOCUMENTS

| | | |
|---|---|---|
| CN | 104859835 | 8/2015 |
| DE | 2837802 A1 | 8/1979 |
| DE | 102011086786 B3 | 3/2013 |
| EP | 1054583 A2 | 11/2000 |
| GB | 2476253 A | 6/2011 |
| JP | 9-4962 | 1/1997 |
| TW | I289655 B | 11/2007 |
| WO | WO2013097031 A2 | 7/2013 |
| WO | WO2016/057471 A1 | 4/2016 |

OTHER PUBLICATIONS

Great Britain Office Action Corresponding to GB Application No. GB16149072 dated Oct. 30, 2017.

Great Britain Office Action Corresponding to GB Application No. GB 16149072 dated Mar. 20, 2018.

Great Britain Office Action Corresponding to GB Application No. GB16149072 dated Jul. 27, 2018.

Great Britain Search Report and Examination Corresponding to GB Application No. 1614907.2 dated Jan. 24, 2017.

Air pollution Control Technology Fact Sheet, Wet Electrostatic Precipitator (ESP), Wire-Pipe Type, EPA-452/F-03-029, Oct. 23, 2018, pp. 1-4. Retrieved from Internet URL: https://www3.epa.gov/ttnchie1/mkb/documents/fwespwpi.pdf.

Ameli et al., A Novel Method for Manufacturing Sintered Aluminium Heat Pipes (SAHP), Applied Thermal Engineering, vol. 52, Issue 2, Apr. 15, 2013, pp. 498-504.

Arif-Uz-Zaman et al., A Novel Dehumidification Technique Using Electric Field, IEEE Transactions on Industry Applications, vol. 32, Issue 1, Jan./Feb. 1996, pp. 36-40.

Battery Prognostics-Prognosis Framework, National Aeronautics and Space Administration, May 8, 2014, pp. 1-3. Retrieved from Internet URL: https://ti.arc.nasa.gov/tech/dash/groups/pcoe/battery-prognostics/prognosis-framework/.

Bendt, Are We Missing Energy Savings in Clothes Dryers?, ACEEE Summer Study on Energy Efficiency in Buildings, 2010, pp. 9-42 to 9-55.

Brackett et al., Topology Optimization for Additive Manufacturing, Wolfson School of Mechanical and Manufacturing Engineering, Loughborough University, Aug. 17, 2011, Loughborough, Leicestershire, LE11 3TU, UK, pp. 348-362.

Brotan et al., The hybrid manufacturing cell: Determining key parameters in the integration of powder bed fusion with high speed milling, Industrial Engineering and Engineering Management (IEEM), 2012 IEEE International Conference on Dec. 10-13, 2012, Hong Kong, pp. 583-587.

Brown et al., Thermal management issues and evaluation of a novel, flexible substrate, 3-dimensional (3-D) packaging concept, Multichip Modules and High Density Packaging, 1998 International Conference Apr. 15-17, 1998, Denver, CO , pp. 135-140.

Buckley et al., Application of Wet Electrostatic Precipitation Technology in the Utility Industry for Multiple Pollutant Control Including Mercury, Croll-Reynolds Clean Air Technologies, 2003, pp. 1-14.

Buekens, Electrostatic Precipitators, Pollution Control Technologies, Encyclopedia of Life Support Systems (EOLSS), vol. 1, 2008, pp. 1-9.

Building Energy Efficiency Frontiers and Incubator Technologies Benefit—2014, Funding Opportunity Announcement (FOA) No. DE-FOA-0001027, 2014, pp. 1-94.

Dukhan et al., An improved PCM Heat Storage Technology Utilizing Metal Foam, 2010 $12^{th}$ IEEE Intersociety Conference on Thermal and Thermomechanical Phenomena in Electronic Systems, (ITherm), Las Vegas, NV, Jun. 2-5, 2010, pp. 1-7.

Energy Star Emerging Technology Award Requirements: Advanced Dryers, Feb. 9, 2012, p. 1. Retrieved from Internet URL: https://www.energystar.gov/sites/default/files/asset/document/2012_ENERGY_STAR_Emerging_Technology_Award_Advanced_Clothes_Dryers_Requirements.pdf.

Engineers guide to military aerospace and avionics, An Interview with General Micro Systems' CEO Ben Sharfi, Extension Media, Application Solutions, 2014, 44 Pages.

Goswami et al., Analysis of Thermal Energy Storage in Cylindrical PCM Capsules Embedded in a Metal Matrix, Energy Conversion Engineering Conference 1990, IECEC-90 Proceedings of the $25^{th}$ Inersociety, vol. 4, Aug. 12-17, 1990, pp. 257-262.

Green et al., Dynamic Thermal management of high heat flux devices using embedded solid-liquid phase change materials and solid state coolers, Thermal and Thermomechanical Phenomena in Electronic Systems, 13th IEEE Intersociety Conference on May 30, 2012-Jun. 1, 2012, pp. 853-862.

Gulli et al., Variable Transpiration Cooling for the Thermal Management of Reusable Hypersonic Vehicles, Aerospace Science and Technology, Elsevier, vol. 29, 2013, pp. 434-444.

Gurijanov, Ajax: New Directions in Hypersonic Technology, American Institute of Aeronautics and Astronautics, Inc., AIAA Paper 96-4609, 1996, pp. 9.

Hara et al., Optimization for Chip Stack in 3-D Packaging, Advanced Packaging, IEEE Transactions on, vol. 28, Issue 3, Aug. 2005, pp. 367-376.

Lee, Ventless Drying—The New Standard of Efficiency, Jul. 30, 2010, pp. 1-2 .

Miles et al., Plasma-Enhanced Hypersonic Performance Enabled by MHD Power Extraction, AIAA 2005-0561, $43^{rd}$ AIAA Aerospace Sciences Meeting and Exhibit, Reno Nevada, Jan. 10-13, 2005, 16 Pages.

Mochizuki et al., A Review of Heat Pipe Application Including New Opportunities, Frontiers in Heat Pipes, Global Digital Central, vol. 2, 013001, 2011, 15 Pages.

(56) References Cited

OTHER PUBLICATIONS

Pingsheng et al., Effect of Charge on Growth of Droplets with Ionic Condensation Nuclei, Chinese Science Bulletin, vol. 56, No. 18. Jun. 2011, pp. 1942-1946.
Radiant Heating With Infrared—A Technical Guide to Understanding and Applying Infrared Heaters, Watlow Electric Manufacturing Company, 1997, pp. 1-39.
Rawal et al., Thermal management for multifunctional structures, Advanced Packaging, IEEE Transactions, vol. 22, Issue: 3, Denver. CO,. Aug. 1999, pp. 379-383.
Residential Clothes Dryers, Energy Star Market & Industry Scoping Report: Dryers, Nov. 2011, pp. 1-18.
Reznikov et al., Corona discharge in the steam for electrostatically enforced condensation, Proceedings 2012 Electrostatics Joint Conference, Jun. 2012, pp. 1-4.
Reznikov et al., Electrohydrodynamic Enforcement of Evaporation and Gas Flow, IEEE Transactions on Industry Applications, vol. 47, No. 2, Mar./Apr. 2011, pp. 1036-1042.
Robak, Latent Heat Thermal Energy Storage with Embedded Heat Pipes for Concentrating Solar Power Applications, University of Connecticut Master's Theses, Paper 229. Obtained from: https://opencommons.uconn.edu/gs_theses/229/.
Salazar et al., Electrospray as an Enforcement of Steam Condensation, Proc. ESA Annual Meeting on Electrostatics, 2013, pp. 1-10.
Subracks, Enclosure Frames, Pixux Technologies.
Tapuchi et al., Obtaining Fresh Water from Atmosphere using Electrostatic Precipitation: Theory, Efficiency and Limitations, E-Water, Official Publication of the European Water Association (EWA), 2010, pp. 1-6.
Vanwie_et al., Hypersonic Airbreathing Propulsion, John Hopkins APL Technical Digest, vol. 26, No. 4, 2005, pp. 430-437.
Wang et al., Numerical Investigation on the Optimization of Local Transpiration Cooling Effectiveness, Applied Thermal Engineering, ScienceDirect, vol. 127, 2017, pp. 58-69.
Wu et al., Investigation of the Polymer Wick Structure Applied to Loop Heat Pipe, 2009 4th International Microsystems, Packaging, Assembly and Circuits Technology Conference, Oct. 21-23, 2009, pp. 368-371.
Yang, Corona-Driven Air Propulsion for Cooling of Microelectronics, Master of Science in Electrical Engineering. 2002, pp. 1-81.
Yogev et al., PCM Storage System with Integrated Active Heat Pipe, Energy Procedia, Proceedings of the Solar PACES 2013 International Conference, ScienceDirect, vol. 49, 2014, pp. 1061-1070.
Zukowski, Experimental Study of Short Term Thermal Energy Storage Unit Based on Enclosed Phase Change Material in Polyethylene Film Bag, Energy Conversion and Management, vol. 48, Issue 1, Jan. 2007, pp. 166-173.

* cited by examiner

SYSTEM AND METHOD FOR COOLING A LEADING EDGE OF A HIGH SPEED VEHICLE

FIELD

The present subject matter relates generally leading edge technologies for use in high speed vehicles, such as hypersonic aircraft.

BACKGROUND

High speed vehicles often experience thermal management issues resulting from high heat load experienced during high speed operation, particularly at leading edges where the free air stream impinges on the vehicle. For example, in an application involving hypersonic aircrafts, the leading edges can include the nose, engine cowls, and the leading edges of wings and stabilizers. Particularly when these vehicles are operating in the hypersonic speed range (e.g., Mach 5 or greater), the leading edges may be subjected to very high heat load (e.g., 500-1500 W/cm$^2$) as the incident airflow passes through a bow shock and comes to rest at the vehicle surface, converting the kinetic energy of the gas to internal energy and greatly increasing its temperature. Unmitigated exposure to such thermal loading can result in component degradation and/or failure.

Improvements in materials and manufacturing techniques have enabled hypersonic aircraft to operate at higher speeds and temperatures. For example, materials have been developed to increase the temperatures that a component can withstand while maintaining its structural integrity. In this regard, for example, nickel-based superalloys might be used to 800° C., single-crystal materials might be used to 1200° C., and refractory metals may be required for even higher temperatures. In addition, various cooling technologies have been developed to provide cooling to the leading edges of hypersonic vehicles. However, corresponding advancements in vehicle speed and duration of high speed flight times have created the need for further improvement in the cooling ability and high temperature durability of the leading edges of high speed vehicles.

Accordingly, improvements to hypersonic aircraft and propulsion technologies would be useful. More specifically, improvements in leading edge technologies and methods of cooling leading edges or hypersonic vehicles would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a leading edge assembly for a hypersonic vehicle is provided. The leading edge assembly includes an outer wall that is tapered to a leading edge, wherein the outer wall at least partially defines a vapor chamber, a capillary structure positioned on an inner surface of the outer wall within the vapor chamber, and a thermal energy storage assembly positioned in thermal communication with the vapor chamber.

According to another exemplary embodiment, a leading edge assembly for a hypersonic vehicle is provided. The leading edge assembly includes an outer wall that is tapered to a leading edge, wherein the outer wall at least partially defines a vapor chamber, a capillary structure positioned on an inner surface of the outer wall within the vapor chamber, and a thermal energy storage assembly positioned within the vapor chamber, the thermal energy storage assembly including a reservoir wall containing a phase change material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, aspects of the present subject matter are directed to leading edge assemblies for high speed aircraft or vehicles, such as hypersonic aircraft. As used herein, the term "hypersonic" refers generally to air speeds of about Mach 4 up to about Mach 10 or greater, such as Mach 5 and up. However, it should be appreciated that aspects of the present subject matter are not limited only to hypersonic flight, but may instead apply to applications involving other high speed vehicles, projectiles, objects, etc. The description of leading edge assemblies herein with respect to use on a hypersonic aircraft are only examples intended to facilitate the explanation of aspects of the present subject matter. The present subject matter is not limited to such exemplary embodiments and applications.

Notably, as explained above, high speed vehicles, such as a hypersonic aircraft, typically experience extremely high temperatures and thermal gradients during high speed or hypersonic operation. The temperature gradients that are caused by the high heat flux are often a more severe problem than the temperature itself. For example, the thermal conductivity of the structural material, in combination with the heat flux, sets the temperature gradient within the material, and at high heat loads this gradient leads to mechanical stresses that cause plastic deformation or fracture of the material. The heat load to the structural material should be reduced to maintain the structural integrity of the components.

As explained above, the leading edges of such high speed vehicles often experience the highest thermal loading. For example, a hypersonic vehicle may include a plurality of leading edge assemblies (e.g., identified generally herein by reference numeral 300) which experience high thermal loads during hypersonic flight. In this regard, leading edge assemblies 300 may be provided on a forward end of the aircraft wings, the nose cone, the vertical stabilizer, the engine cowls of the propulsion engines, or other leading edges or surfaces of the hypersonic aircraft. According to exemplary embodiments of the present subject matter, leading edge assemblies 300 include features for mitigating the effects of such thermal loading, e.g., by carrying heat out of the region.

Notably, it is typically desirable to make leading edge assemblies 300 as sharp or pointed as possible, e.g., in order to reduce drag on the hypersonic vehicle. However, referring now to FIG. 1, when leading edge assemblies 300 are formed into a small radius of curvature, extremely high temperatures and thermal gradients are experienced within leading edge assembly 300 at its forward or leading edge, also referred to herein as a stagnation line, a stagnation point 302, or similar terms. In this regard, as a hypersonic vehicle is traveling through air at hypersonic speeds, a free stream flow of air (e.g., identified herein by reference numeral 304) passes over and around leading edge assembly 300, thereby generating large thermal loads. Aspects of the present subject matter are directed to thermal management technologies and features for cooling leading edge assemblies 300, with a particular focus on the regions close to stagnation point 302, where the most serious thermal management issues typically arise.

It should be appreciated that the leading edge assemblies 300 illustrated herein are simplified cross section illustrations of exemplary leading edges. The size, configuration, geometry, and application of such leading edge technologies may vary while remaining within the scope of the present subject matter. For example, the leading edge assemblies 300 described herein define a radius of between about 1 mm and 3 mm. However, according to alternative embodiments, leading edge assemblies could have any other suitable radii.

The cooling technologies and thermal management features are described herein as being used to cool portions of one or more parts of a hypersonic aircraft, such as the leading edges of the wings, nose, propulsion engines, or other parts of the hypersonic aircraft that experience large temperatures and thermal gradients. However, it should be appreciated that aspects of the present subject matter may be used to manage thermal loading such as high temperatures and thermal gradients within any component and in any suitable application. In this regard, for example, aspects of the present subject matter may apply to any other hypersonic vehicle or to any other technology or system having components that are exposed to high temperatures and/or large temperature gradients.

In addition, although various techniques, component configurations, and systems are described herein for cooling leading edge assemblies 300 of a hypersonic vehicle, it should be appreciated that variations and modifications may be made to such technologies without departing from the scope of the present subject matter. In addition, one or more such technologies may be used in combination with each other to achieve improved cooling and thermal management. In this regard, although each cooling technology is described in isolation in order to clearly describe how each technology functions, the embodiments described are only examples intended for the purpose of illustration and explanation, and are not intended to limit the scope of the present subject matter in any manner.

In addition, according to exemplary embodiments of the present subject matter, some or all components described herein may be formed using an additive-manufacturing process, such as a 3-D printing process. The use of such a process may allow certain components of a hypersonic vehicle, such as leading edge assemblies 300, to be formed integrally, as a single monolithic component, or as any suitable number of sub-components. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be metal, concrete, ceramic, epoxy, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Figure 1:
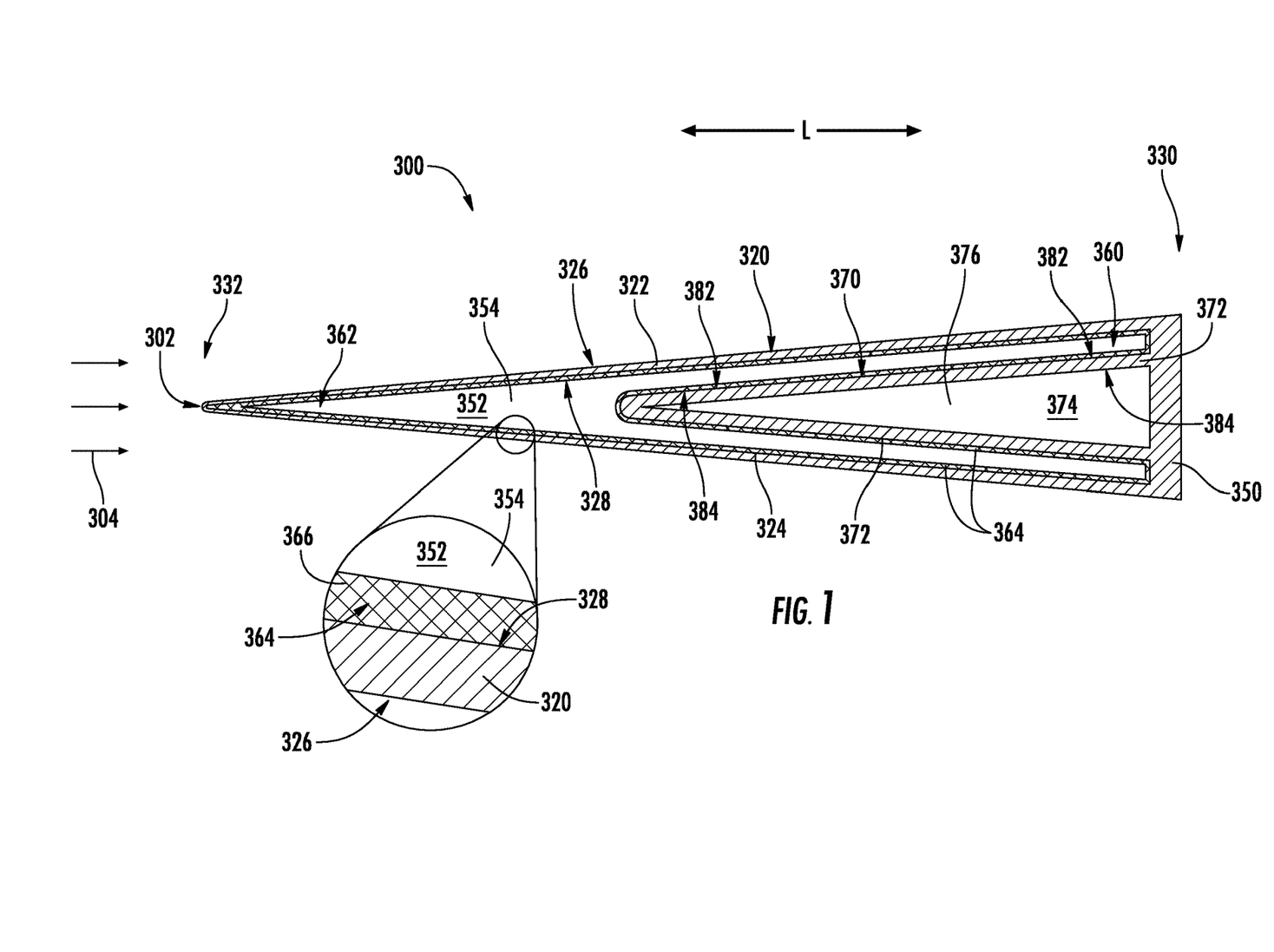
FIG. 1 is a close-up, cross-sectional, schematic view of a leading edge of a hypersonic vehicle in accordance with an exemplary embodiment of the present disclosure.

Referring still to FIG. 1, leading edge assembly 300 will be described in more detail according to an exemplary embodiment of the present subject matter. Specifically, FIG. 1 provides a cross-sectional view of a leading edge assembly 300, which may be positioned at a leading edge (e.g., a forward end, a leading end, upstream end, etc.) of any component of a hypersonic aircraft. For example, leading edge assembly 300 may be, e.g., a leading edge of an inlet duct to a hypersonic propulsion engine, a leading edge of a turbine engine, a leading edge of a wing of the aircraft, a nose of the aircraft, a forward end of a vertical stabilizer, etc.

As explained herein, large thermal loads may be experienced by leading edge assemblies 300 during hypersonic flight operations. As used herein, the terms "thermal load" and the like are intended generally to refer to the high temperatures, temperature gradients, or heat flux experienced within a component of a hypersonic or high-speed vehicle. According to exemplary embodiments of the present subject matter, leading edge assemblies 300 are formed or provided with thermal regulation features or technologies for managing these thermal loads.

Figure 2:
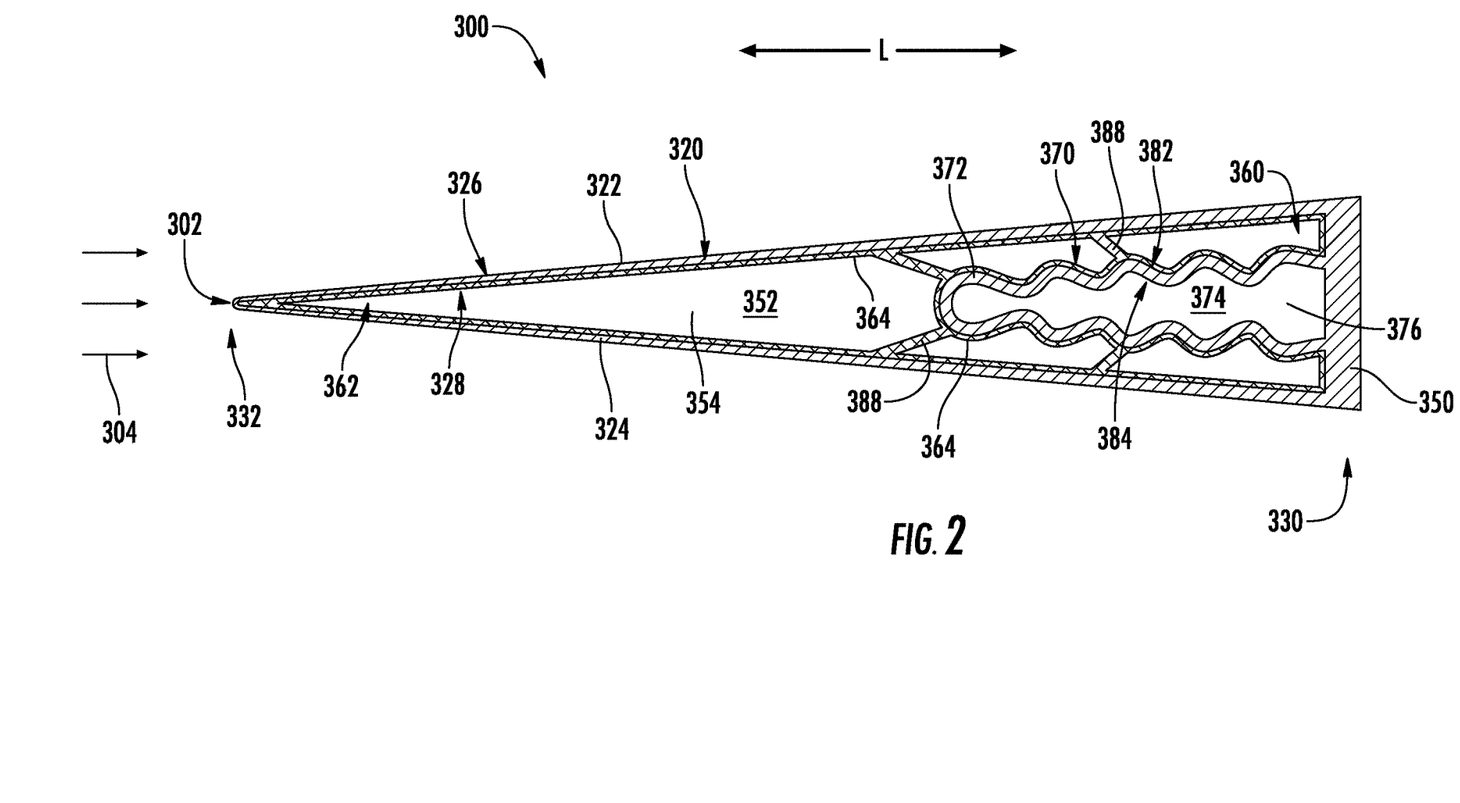
FIG. 2 is a close-up, cross-sectional, schematic view of a leading edge of a hypersonic vehicle in accordance with another exemplary embodiment of the present disclosure.
Figure 3:
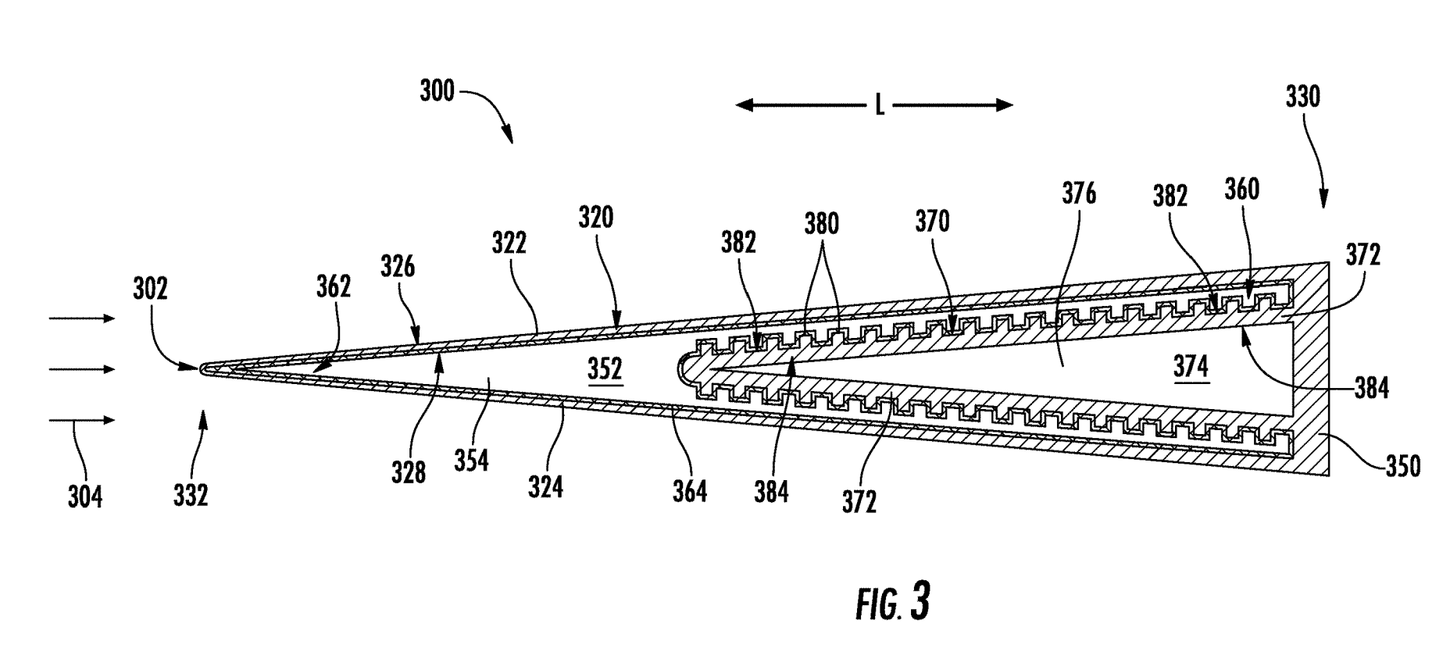
FIG. 3 is a close-up, cross-sectional, schematic view of a leading edge of a hypersonic vehicle in accordance with another exemplary embodiment of the present disclosure.
Figure 4:
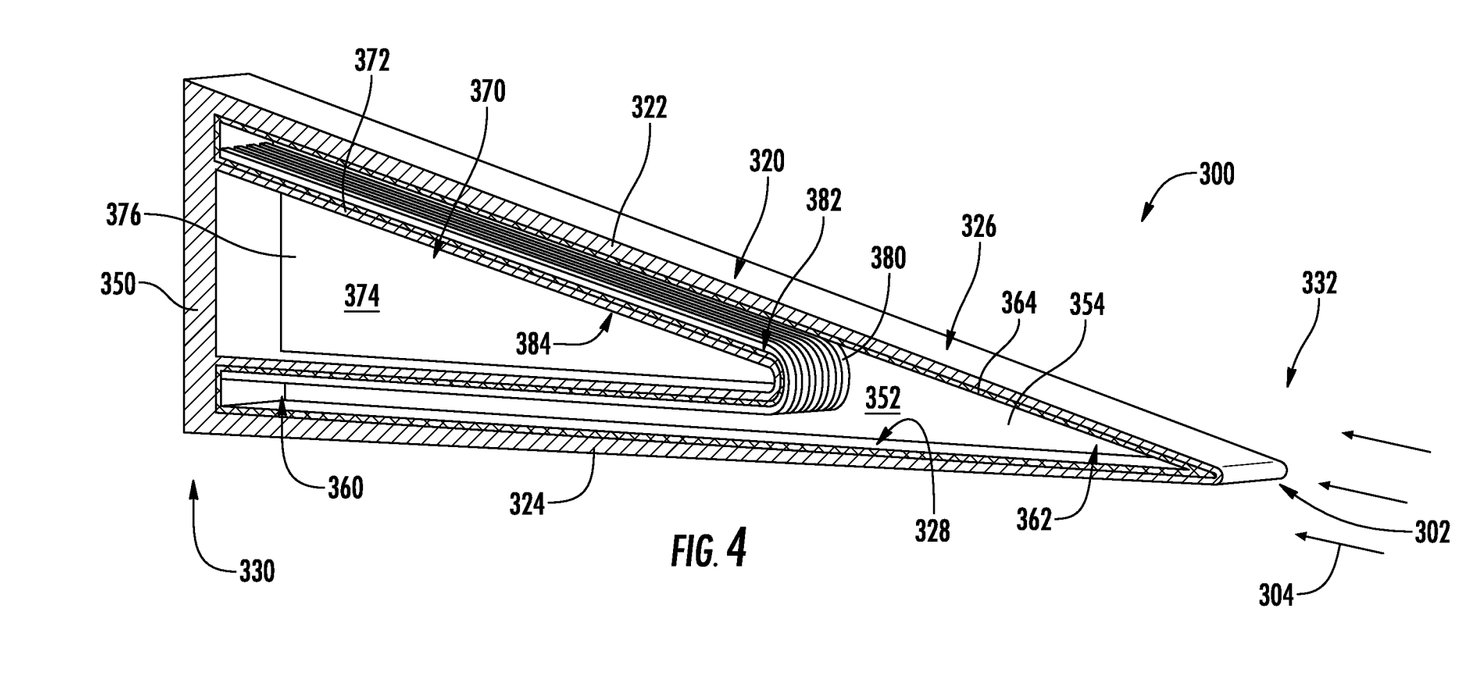
FIG. 4 is a close-up, cross-sectional, schematic view of a leading edge of a hypersonic vehicle in accordance with another exemplary embodiment of the present disclosure.

For example, as described in more detail below with reference to FIG. 1, leading edge assembly 300 may include features for providing or distributing a cooling fluid or material within an outer wall 320 of leading edge assembly 300 to move thermal energy from relatively hot location, e.g., proximate stagnation point 302, to relatively cold regions downstream of stagnation point. In this manner, the temperature gradient experienced within leading edge assembly 300 may be reduced. FIGS. 2 through 4 provide cooling technologies for leading edge assemblies 300 according to alternative embodiments. It should be appreciated that the thermal regulation features and technologies described herein for each exemplary leading edge assembly 300 may be used alone or in combination with any other leading edge technologies described herein to regulate the thermal loading on one or more leading edge assemblies 300 of a hypersonic vehicle, or any other surface of any other component that experiences high thermal loading.

As explained above, outer wall 320 and other components of leading edge assembly 300 may be formed from any suitable material. According to an exemplary embodiment, such materials are selected to withstand the high thermal loading experienced by the leading edges of a hypersonic aircraft. For example, outer wall 320 may be constructed from at least one of aluminum, titanium, titanium aluminide, tungsten, tungsten alloy, nickel superalloy, refractory metal, single-crystal metal, ceramic, ceramic matrix composite (CMC), ultra-high temperature ceramics (UHTCs, including high melting point diborides, nitrides, etc.), or carbon-carbon composite. In addition, or alternatively, outer wall 320 may include composites such as silicon carbide (SiC), SiC composites, carbon-fiber reinforced SiC matrix and other carbide matrix composites, composites with and without surface coatings, and/or high entropy alloys, including refractories, platinum group metals, hafnium alloys, etc.

Nevertheless, it may still be desirable in certain applications to provide additional cooling capacity for thermal management of the high heat loads experienced by leading edge assembly 300. Moreover, as explained above, the additive manufacturing technologies may be used to print leading edge assembly 300 (e.g. including outer wall 320) as a single monolithic component, and may facilitate improved cooling technologies and leading edge features.

As is shown in the embodiment depicted, the outer wall 320 is generally formed by a first wall section 322 and a second wall section 324 that meet or join at stagnation point 302. More specifically, the first wall section 322 and the second wall section 324 each include outer surfaces together forming an outer surface 326 and inner surfaces together forming an inner surface 328. In addition, first wall section 322 and second wall section 324 may be angled relative to each other such that leading edge assembly 300 is tapered from an aft end 330 of leading edge assembly 300 to a forward end 332 of leading edge assembly 300 (e.g., which corresponds to stagnation point 302). In other words, leading edge assembly 300 is wider or taller proximate aft end 330 of leading edge assembly 300 and narrows as it approaches stagnation point 302. Notably, the taper angle may vary depending on aerodynamic and other considerations while remaining within the scope of the present subject matter. For example, according to exemplary embodiments, leading edge assembly 300 may not be symmetric, e.g., defining a sharper angle on one side.

As described above, for the embodiment shown, the outer surfaces 326 of the first wall section 322 and the second wall section 324 meet at a stagnation point 302 and generally form a leading edge portion of the outer wall 320, and define at least part of outer surface 326 and inner surface 328. For the embodiment depicted, leading edge assembly 300 may include aft bulkhead 350 positioned at an aft end 330 of outer wall 320 and extending substantially perpendicular to a longitudinal direction L. Specifically, as illustrated, aft bulkhead 350 extends between and connects the first wall section 322 and second wall section 324 at aft end 330 of leading edge assembly 300. In addition, aft bulkhead 350 may connect to the rest of a hypersonic vehicle, may be a replaceable component, etc.

In this manner, first wall section 322, second wall section 324, and an aft bulkhead 350 may generally define a cavity or a vapor chamber 352 that is enclosed and defined by inner surface 328. Thus, according to the exemplary embodiment, vapor chamber 352 may be an enclosed, constant volume chamber or reservoir. According to an exemplary embodiment, vapor chamber 352 may be filled or charged with a working fluid 354 which is used to transfer thermal energy within leading edge assembly 300. In addition, outer wall 320 and aft bulkhead 350 may be hermetic or impermeable walls such that vapor chamber 352 may be a hermetically sealed chamber for containing working fluid 354. When leading edge assembly 300 is constructed as described herein, it may generally operate as a heat pipe, or a type of heat exchanger that may be used to transfer thermal energy through the evaporation and condensation of a working fluid, such as working fluid 354, as described in more detail below.

Working fluid 354 generally be any fluid or gas that may circulate within vapor chamber 352 to transfer thermal energy from relatively hot regions of leading edge assembly 300 (i.e., proximate stagnation point 302) to relatively cool regions of leading edge assembly 300 (e.g., regions downstream from stagnation point 302). Working fluid should generally be selected such that it is compatible with leading edge assembly 300 and is suitable for the desired operating range. For example, according to exemplary embodiments, working fluid 354 may include at least one of water, steam, acetone, methanol, ethanol, toluene, etc. According to still other embodiments, working fluid 354 may include one or more of lithium, sodium, silver, etc. As described in more detail below, working fluid 354 may be configured for evaporating from a liquid to a gaseous state to absorb thermal energy and for condensing from the gaseous state back to the liquid state to discharge the thermal energy into cooler regions or surfaces of leading edge assembly 300.

According to the illustrated embodiment, vapor chamber 352 generally extends between a condenser section or condenser region 360 at one end of vapor chamber 352 and an evaporator section or evaporator region 362 at an opposite end of vapor chamber 352. Specifically, as illustrated, evaporator region 362 is positioned proximate forward end 332 of leading edge assembly 300, e.g., proximate stagnation point 302, where the temperature and heat flux are typically the highest. By contrast, condenser region 360 may generally be positioned proximate aft end 330 of leading edge assembly 300, where temperatures are relatively low compared to stagnation point 302.

Although condenser region 360 and evaporator region 362 are illustrated as being localized at the aft and forward ends, respectively, of leading edge assembly 300, it should be appreciated that the regions acting as an evaporator or condenser surface may vary, e.g., depending on operating conditions. For example, according to certain operating conditions, condenser region 360 may extend along the entire outer wall 320 with the exception of the leading edge region at forward end 332, e.g., immediately adjacent stagnation point 302.

During operation, the working fluid 354 contained within vapor chamber 352 of leading edge assembly 300 absorbs thermal energy at the evaporator region 362, e.g., at stagnation point 302. The working fluid 354 fluid may evaporate and travel in a gaseous state from the evaporator region 362 to the condenser region 360. At the condenser region 360, the gaseous working fluid 354 condenses to a liquid state and thereby releases thermal energy. The working fluid 354 may then flow in liquid form back to the evaporator region 362, e.g., by capillary flow as described below. In this manner, vapor chamber 352 and working fluid 354 generally operate as a heat pipe, transferring thermal energy from portions of leading edge assembly 300 experiencing the highest heat load toward regions of leading edge assembly 300 which experience relatively low heat load. After the heat is transferred to the aft surfaces (e.g., proximate condenser region 360), that heat can be rejected from the leading edge assembly 300 in the form of thermal radiation.

It should be appreciated that the terms "liquid" and "vapor" are used herein generally to refer to the phases or states of working fluid 354 as it passes within vapor chamber 352 between condenser region 360 and evaporator region 362. However, it should be appreciated that the present subject matter does not require that all working fluid 354 in the condenser region 360 be a liquid, and vice versa, that all working fluid 354 in evaporator region 362 be a vapor. Depending on the current operating conditions of leading edge assembly 300, working fluid 354 may be in any suitable state without departing from the scope of the present subject matter.

As best shown in the magnified portion of FIG. 1, leading edge assembly 300 may further include a capillary structure 364 that is positioned within vapor chamber 352 for circulating working fluid 354. Specifically, as illustrated, capillary structure 364 is positioned on inner surface 328 of outer wall 320 within vapor chamber 352. In this regard, capillary structure 364 may line or cover all or part of the perimeter of inner surface 328 for transporting condensed working fluid 354 toward stagnation point 302 of leading edge 300.

Capillary structure 364 may generally be any component, feature, material, or structure configured for to transporting liquid working fluid 354 from the condenser region 360 to the evaporator region 362 by capillary flow or forces. For example, capillary structure 364 may be a porous or mesh membrane 366 (as shown in FIG. 1). Alternatively, capillary structure 364 may be an array of capillary tubes, an offset wall, a porous structure, a wick, a screen, a honeycomb structure, or any other structure configured for promoting a flow of liquid working fluid 354 toward evaporator region 362.

Referring still to FIG. 1, leading edge assembly 300 may further include a thermal energy storage assembly 370 that is positioned within, or in thermal communication with, vapor chamber 352. As explained in more detail below, thermal energy storage assembly 370 is generally configured for absorbing thermal energy from working fluid 354, particularly in the event of extremely high temperatures experienced at leading edge assembly 300. In this regard, for example, during normal high heat operation of leading edge assembly 300, vapor chamber 352 and working fluid 354 may operate to reduce the temperature of stagnation point 302 and forward end 332 of outer wall 320 to a suitably low temperature for maintaining structural integrity. However, under extreme heating conditions, working fluid 354 may not be capable of transferring sufficient amounts of heat for maintaining structural integrity. However, as will be described in more detail below, thermal energy storage assembly 370 may be configured for providing additional condenser surface area for absorbing thermal energy from the superheated working fluid 354 under these extreme heating conditions.

Referring still to the figures, thermal energy storage assembly 370 generally includes a reservoir wall 372 that defines an internal chamber 374 within vapor chamber 352. According to the illustrated embodiment, thermal energy storage assembly 370, or more specifically internal chamber 374, is positioned proximate aft bulkhead 350 of leading edge assembly 300. Although internal chamber 374 is described and illustrated herein as being positioned within vapor chamber 352, it should be appreciated that according to alternative embodiments, any suitable thermal communication between internal chamber 374 and vapor chamber 352 may be used while remaining within the scope of the present subject matter. Thus, according to alternative embodiments, internal chamber 374 could instead be positioned immediately adjacent to and in thermal contact with vapor chamber 352.

According to exemplary embodiments, internal chamber 374 may contain a phase change material 376, which is generally configured for absorbing thermal energy from working fluid 354. In general, phase change material 376 may be any material or substance that is selected for changing its state or phase (e.g., melting and/or solidifying) at a desired temperature. When such a phase change occurs, phase change material 376 may absorb or release large amounts of thermal energy (referred to generally herein as latent heat). Specifically, for example, phase change material 376 may be selected such that it melts when extremely high temperatures are experienced by leading edge assembly 300. When such predetermined critical temperatures are reached, phase change material 376 melts, thereby absorbing large amounts of heat from working fluid 354.

Phase change material 376 may generally be any material selected for changing phases at the desired temperatures for cooling leading edge assembly 300. For example, according to an exemplary embodiment, phase change material 376 may comprise silicon or beryllium. According to certain exemplary embodiments, phase change material may have a melting temperature above a predetermined threshold or within a desired range. For example, according to an exemplary embodiment, the melting temperature of phase change material 376 may be greater than 500° C., greater than 1000° C., greater than 1200° C., greater than 1500° C., or greater. In addition, or alternatively, phase change material 376 may have a melting temperature below 3000° C., below 2500° C., below 2000° C., below 1500° C., below 1000° C., or lower. Other melting temperatures are possible and within the scope of the present subject matter.

According to exemplary embodiments, phase change material 376 may be selected based at least in part on the latent heat of fusion. For example, phase change material 376 may be selected such that it has a latent heat of fusion between about 100 and 1000 kJ/kg, between about 200 and 800 kJ/kg, between about 250 and 500 kJ/kg, or greater than about 300 kJ/kg. According to exemplary embodiments, phase change material 376 may be selected to have a latent heat of fusion above 800 kJ/kg, above 1000 kJ/kg, or higher. It should be appreciated that phase change material may be selected based on the melting temperature, the latent heat of fusion, some combination of both of those parameters, or based on any other suitable material property.

In addition, although exemplary embodiments illustrated herein include a single internal chamber 374 for containing a single phase change material 376, it should be appreciated that according to alternative embodiments thermal energy storage assembly 370 may include multiple chambers (not shown), each of which may contain one or more different phase change materials 376. In this manner, for example, if leading edge assembly 300 is designed for operation in two different extreme temperature regions, phase change materials 376 may be selected for absorbing thermal energy within each region. Specifically, a first phase change material 376 may be selected such that it has a first melting temperature and is designed to absorb latent heat when working fluid 354 reaches the first melting temperature. In addition, a second phase change material 376 may be selected such that it has a second melting temperature and is designed to absorb latent heat when working fluid 354 reaches the second melting temperature. Additional phase change materials, melting temperatures, and chamber configurations are possible and within the scope of the present subject matter.

According to the illustrated embodiment, reservoir wall 372 (which may also include a wick or capillary structure 364) extends substantially parallel to outer wall 320. However, according to an exemplary embodiment, portions of leading edge assembly 300 may include features for improving thermal communication between working fluid 354, outer wall 320, reservoir wall 372, and/or phase change material 376. For example, in order to improve the thermal contact area between reservoir wall 372 in working fluid 354, reservoir wall 372 may have a wavy profile as shown for example in FIG. 2. Alternatively, as shown in FIG. 3, reservoir wall 372 may include a plurality of heat exchange fins 380 that are mounted on an outer surface 382 of reservoir wall 372 and extend into the working fluid 354 to provide improved thermal communication between reservoir wall 372 and working fluid 354.

Although exemplary heat exchange features are illustrated herein, it should be appreciated that any other suitable heat exchange features may be used while remaining within the scope of the present subject matter. For example, FIG. 2 illustrates wavy walls and FIG. 3 illustrates exchange fins 380 that extend substantially perpendicular to outer surface 382 of reservoir wall 372, e.g., in a span wise direction (e.g., into the page as shown in FIG. 3). By contrast, as shown in FIG. 4, heat exchange fins 380 could alternatively extend in a streamwise direction, e.g., parallel to the flow of air 304. In addition, or alternatively, reservoir wall 372 and outer wall 320 may include any suitable number, type, geometry, and configuration of surface aberrations, protrusions, fins, or other suitable features for increasing the rate of thermal transfer. Moreover, although such heat exchange features are illustrated on outer surface 382 of reservoir wall 372, it should be appreciated that such features may also be used on an inner surface 328 of outer wall 320, on an inner surface 384 of reservoir wall 372, or on any other suitable surface of leading edge assembly 300.

In addition, it should be appreciated that the relative volume of internal chamber 374 relative to vapor chamber 352 may vary while remaining within the scope of the present subject matter. For example, a volume of vapor chamber 352 (excluding the region filled by internal chamber 374) may be equal to the volume of internal chamber 374. According still other embodiments, the volume of vapor chamber 352 may be greater than about 1.5 times, 2 times, 3 times, 5 times, or greater, than the volume of internal chamber 374. In addition, or alternatively, the volume of vapor chamber 352 may be less than about 10 times, 5 times, 3 times, or less, than the volume of internal chamber 374.

In addition, according still other embodiments, the volume of internal chamber 374 may be configured for expanding or retracting as needed depending on the state of phase change material 376. In this regard, for example, reservoir wall 372 may be a compliant containment structure that is made from a resilient material that can expand or contract depending on the state of phase change material 376. Alternatively, reservoir wall 372 may include multiple wall segments joined by expansion joints, flexible regions, or other suitable joining mechanisms for permitting phase change material 376 to expand or contract.

Leading edge assembly 300 may further include features for improving the circulation of working fluid 354. For example, referring again to FIG. 2, capillary structure 364 may further include a plurality of liquid bridges 388 that provide a pathway for working fluid 354 to more quickly reach evaporator region 362. In this regard, liquid bridges 388 may include porous microstructures, solid bridges covered in porous microstructures, or any other suitable capillary structure for providing a shorter path for working fluid 354 to move toward evaporator region 362. According to an exemplary embodiment, liquid bridges 388 may extend away from reservoir wall 372, e.g., toward outer wall 320 for providing a shorter path to leading edge 320 relative to the capillary structure 364 on the reservoir wall 372. It should be appreciated that according to exemplary embodiments, the number, size, position, and structure of liquid bridges 388 may vary while remaining within the scope of the present subject matter.

Figure 5:
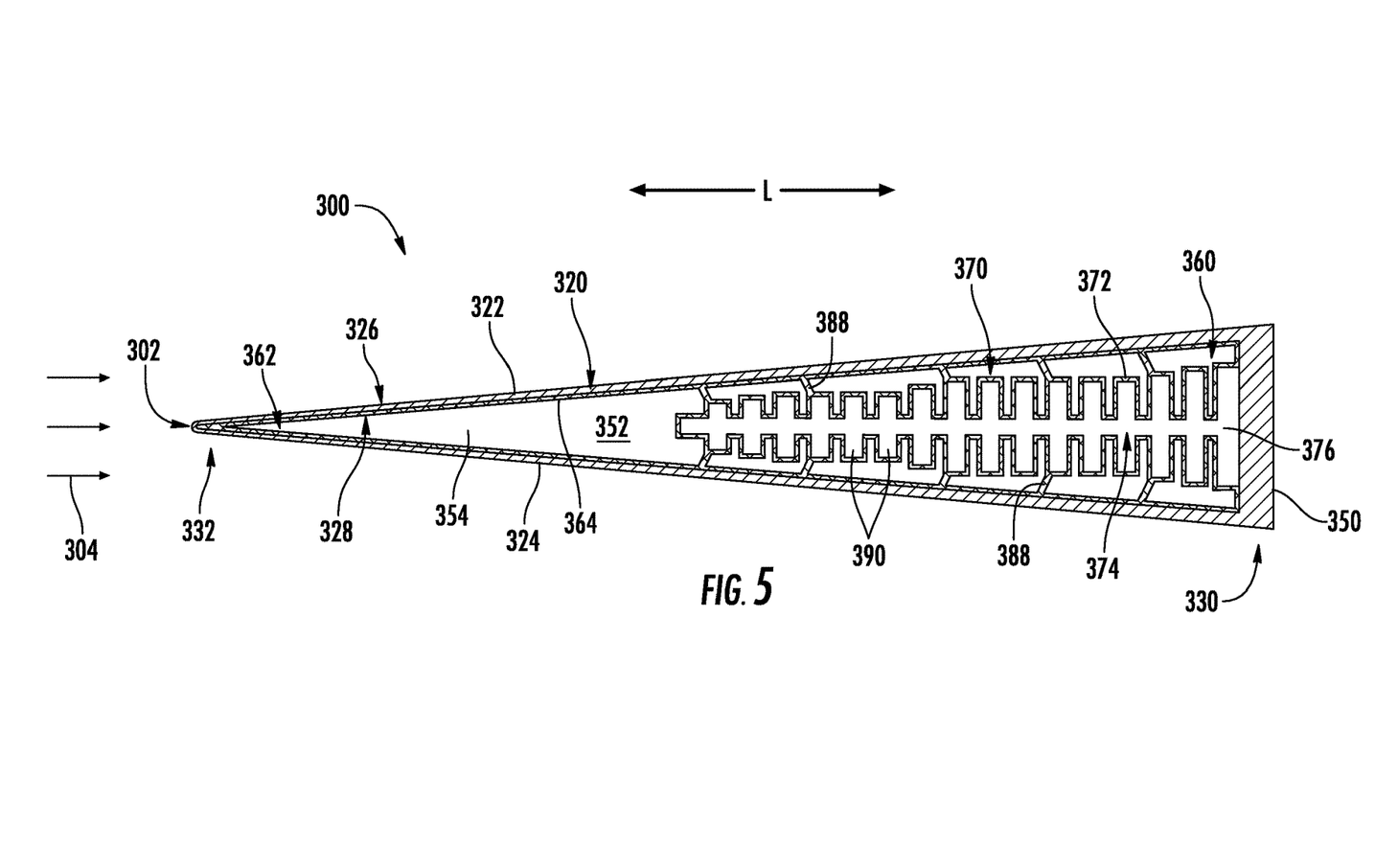
FIG. 5 is a close-up, cross-sectional, schematic view of a leading edge of a hypersonic vehicle in accordance with another exemplary embodiment of the present disclosure.

In addition, thermal energy storage assembly 370 may take any suitable shape and may cover any suitable regions within outer wall 320, e.g., for ensuring uniform melting of phase change material 376 and improved heat distribution. For example, referring for example to FIG. 5, reservoir wall 372 may define a plurality of span wise fins 390 that break up phase change material 376 and improve the surface area to volume ratio of thermal energy storage assembly 370. In this regard, as illustrated, reservoir wall 372 may break the volume of internal chamber 374 into a plurality of regions having a different number, size, shape, and configuration of fins 390. Although span wise fins 390 are illustrated, it should be appreciated that according to alternative embodiments, the fins or protruding structures may extend in any other suitable direction and may have any other suitable size or shape.

Figure 6:
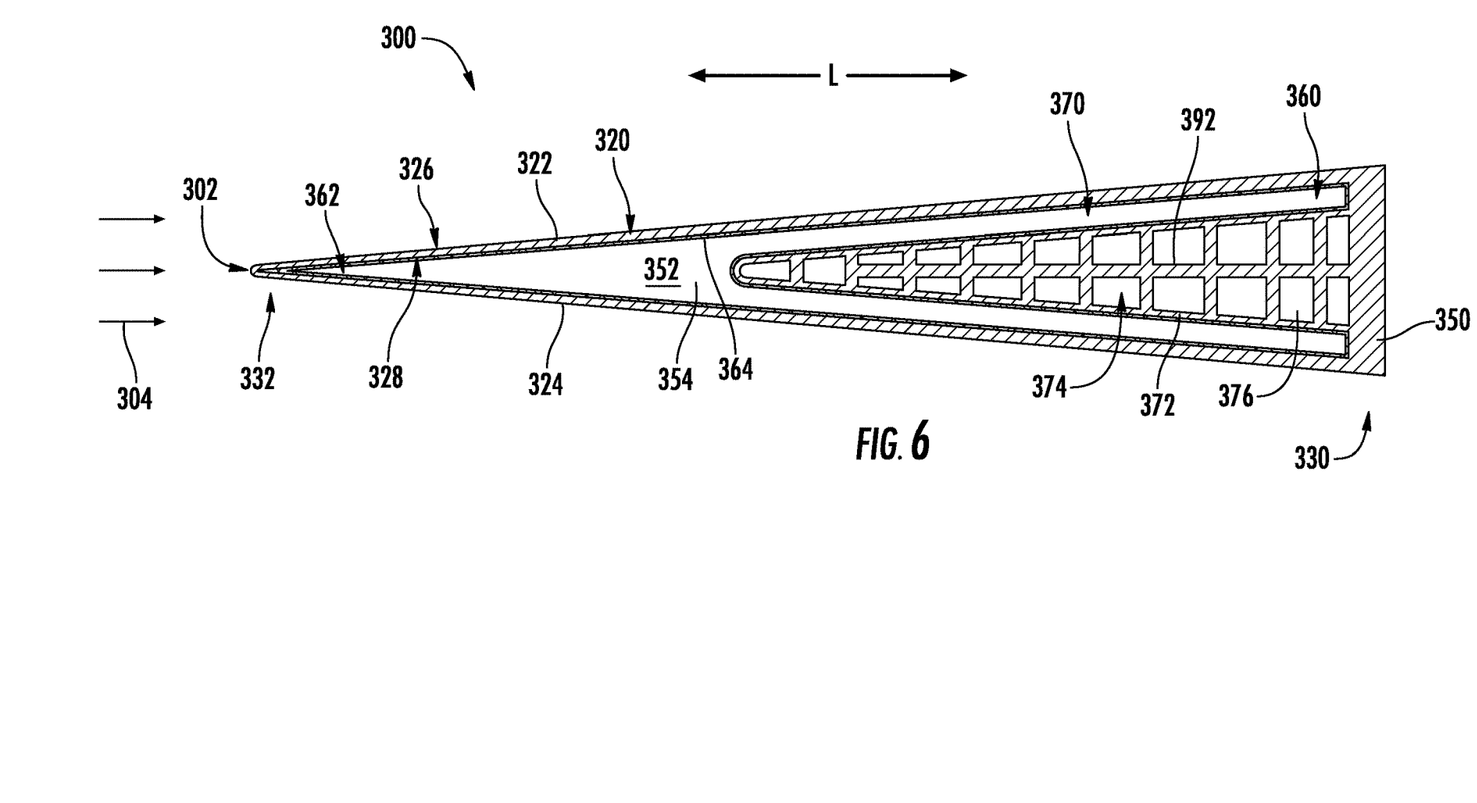
FIG. 6 is a close-up, cross-sectional, schematic view of a leading edge of a hypersonic vehicle in accordance with another exemplary embodiment of the present disclosure.

Referring now to FIG. 6, thermal energy storage assembly 370 may further include conduction paths 392 that extend in any suitable pattern or configuration within internal chamber 374 for distributing thermal energy throughout internal chamber 374 and ensuring even melting and heat distribution therein. For example, according to the illustrated embodiment, conduction paths 392 form a lattice-like structure that extends throughout the entire internal chamber 374. According to exemplary embodiments, conduction paths 392 may be formed from the same material as reservoir wall 372 or any other suitably conductive material. According to exemplary embodiments, the thickness of the lattice may increase towards aft end 330 of internal chamber 374, e.g., to increase the amount of thermal energy transferred to the thickest region of internal chamber 374. It should be appreciated that the size, structure, geometry, and position of conduction paths 392 may vary while remaining within the scope of the present subject matter.

Thus, aspects of the present subject matter disclosed above present an improved leading edge assembly and methods of forming the same for cooling regions of hypersonic aircraft 100 that experience extremely high thermal loading. Notably, leading edge assembly 300, including outer wall 320, reservoir wall 372, capillary structure 364, heat exchange fins 380, and other features, may be additively manufactured as a single, integral, and monolithic piece. In addition, the additive manufacturing methods described herein facilitate the formation of leading edge assembly 300 using any suitable material or materials and enable the formation of extremely intricate heat exchange features with high surface area for improved thermal contact between materials. In addition, the use of a working fluid 354 in a vapor chamber 352 helps transfer thermal energy from hotter regions to cooler regions of leading edge assembly 300, while phase change material 376 helps absorb and manage the high thermal energy generated during hypersonic operation.

Further aspects of the invention are provided by the subject matter of the following clauses:

1. A leading edge assembly for a hypersonic vehicle, the leading edge assembly comprising: an outer wall that is tapered to a leading edge, wherein the outer wall at least partially defines a vapor chamber; a capillary structure positioned on an inner surface of the outer wall within the vapor chamber; and a thermal energy storage assembly positioned in thermal communication with the vapor chamber.

2. The leading edge assembly of any preceding clause, wherein the thermal energy storage assembly comprises: a reservoir wall; and a phase change material positioned within the reservoir wall.

3. The leading edge assembly of any preceding clause, wherein the phase change material comprises silicon or beryllium.

4. The leading edge assembly of any preceding clause, wherein the phase change material has a melting temperature of greater than 1000 degrees Celsius.

5. The leading edge assembly of any preceding clause, wherein the phase change material has a latent heat of fusion greater than 300 kJ/kg.

6. The leading edge assembly of any preceding clause, wherein the thermal energy storage assembly comprises a first chamber containing a first phase change material having a first melting temperature and a second chamber containing a second phase change material having a second melting temperature.

7. The leading edge assembly of any preceding clause, wherein the capillary structure is a wick, a porous structure, or a screen that lines the inner surface of the outer wall and an outer surface of the reservoir wall.

8. The leading edge assembly of any preceding clause, wherein the capillary structure comprises: at least one liquid bridge that extends away from the reservoir wall toward the outer wall for providing a shorter path to the leading edge relative to the capillary structure.

9. The leading edge assembly of any preceding clause, wherein the outer wall, the reservoir wall, and the capillary structure are additively manufactured as a single monolithic component.

10. The leading edge assembly of any preceding clause, wherein the reservoir wall is a compliant containment structure that can expand or contract depending on a state of the phase change material.

11. The leading edge assembly of any preceding clause, wherein the reservoir wall has a wavy profile.

12. The leading edge assembly of any preceding clause, wherein the reservoir wall extends substantially parallel to the outer wall.

13. The leading edge assembly of any preceding clause, further comprising: a plurality of heat exchange fins mounted on an outer surface of the reservoir wall.

14. The leading edge assembly of any preceding clause, wherein each of the plurality of heat exchange fins extends in the streamwise direction.

15. The leading edge assembly of any preceding clause, wherein the thermal energy storage assembly is positioned proximate an aft bulkhead of the leading edge assembly.

16. The leading edge assembly of any preceding clause, wherein the thermal energy storage assembly comprises: one or more conduction paths extending through the internal chamber.

17. The leading edge assembly of any preceding clause, wherein the vapor chamber is charged with lithium, sodium, or silver.

18. The leading edge assembly of any preceding clause, wherein the outer wall is formed from a ceramic matrix composite, carbon-carbon composite, or refractory material.

19. A leading edge assembly for a hypersonic vehicle, the leading edge assembly comprising: an outer wall that is tapered to a leading edge, wherein the outer wall at least partially defines a vapor chamber; a capillary structure positioned on an inner surface of the outer wall within the vapor chamber; and a thermal energy storage assembly positioned within the vapor chamber, the thermal energy storage assembly comprising a reservoir wall containing a phase change material.

20. The leading edge assembly of any preceding clause, wherein the phase change material comprises silicon or beryllium.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A leading edge assembly for a hypersonic vehicle, the leading edge assembly comprising:
    an outer wall that is tapered to a leading edge, wherein the outer wall at least partially defines a vapor chamber;
    a capillary structure positioned on an inner surface of the outer wall within the vapor chamber; and
    a thermal energy storage assembly positioned in thermal communication with the vapor chamber,
    wherein the vapor chamber comprises a working fluid therein,
    wherein the thermal energy storage assembly comprises:
        a reservoir wall extending to a leading edge of the energy storage assembly; and
        a phase change material encased within the reservoir wall such that the phase change material is fluidly isolated from the working fluid,
    wherein the vapor chamber extends between the leading edge of the outer wall and the leading edge of the energy storage assembly, and
    wherein the capillary structure is a wick, a porous structure, or a screen that lines the inner surface of the outer wall and an outer surface of the reservoir wall.

2. The leading edge assembly of claim 1, wherein the phase change material comprises silicon or beryllium.

3. The leading edge assembly of claim 1, wherein the phase change material has a melting temperature of greater than 1000 degrees Celsius.

4. The leading edge assembly of claim 1, wherein the phase change material has a latent heat of fusion greater than 300 kJ/kg.

5. The leading edge assembly of claim 1, wherein the thermal energy storage assembly comprises a first chamber containing a first phase change material having a first melting temperature and a second chamber containing a second phase change material having a second melting temperature.

6. The leading edge assembly of claim 1, wherein the capillary structure comprises:
    at least one liquid bridge that extends away from the reservoir wall toward the outer wall for providing a shorter path to the leading edge relative to the capillary structure.

7. The leading edge assembly of claim 1, wherein the outer wall, the reservoir wall, and the capillary structure are additively manufactured as a single monolithic component.

8. The leading edge assembly of claim 1, wherein the reservoir wall is a compliant containment structure that can expand or contract depending on a state of the phase change material.

9. The leading edge assembly of claim 1, wherein the reservoir wall has a wavy profile.

10. The leading edge assembly of claim 1, wherein the reservoir wall extends substantially parallel to the outer wall.

11. The leading edge assembly of claim 1, further comprising:

a plurality of heat exchange fins mounted on an outer surface of the reservoir wall.

12. The leading edge assembly of claim 11, wherein each of the plurality of heat exchange fins extends in the spanwise direction.

13. The leading edge assembly of claim 1, wherein the thermal energy storage assembly is positioned proximate an aft bulkhead of the leading edge assembly.

14. The leading edge assembly of claim 1, wherein the vapor chamber is charged with lithium, sodium, or silver.

15. The leading edge assembly of claim 1, wherein the outer wall is formed from a ceramic matrix composite, carbon-carbon composite, or refractory material.

16. A leading edge assembly for a hypersonic vehicle, the leading edge assembly comprising:
    an outer wall that is tapered to a leading edge, wherein the outer wall at least partially defines a vapor chamber;
    a capillary structure positioned on an inner surface of the outer wall within the vapor chamber; and
    a thermal energy storage assembly positioned in thermal communication with the vapor chamber,
    wherein the vapor chamber comprises a working fluid therein,
    wherein the thermal energy storage assembly comprises:
        a reservoir wall extending to a leading edge of the energy storage assembly; and
        a phase change material encased within the reservoir wall such that the phase change material is fluidly isolated from the working fluid,
    wherein the vapor chamber extends between the leading edge of the outer wall and the leading edge of the energy storage assembly, and
    wherein the thermal energy storage assembly comprises:
        an internal chamber defined by the reservoir wall within the vapor chamber, and
        one or more conduction paths extending through the internal chamber.

17. A leading edge assembly for a hypersonic vehicle, the leading edge assembly comprising:
    an outer wall that is tapered to a leading edge, wherein the outer wall at least partially defines a vapor chamber;
    a capillary structure positioned on an inner surface of the outer wall within the vapor chamber; and
    a thermal energy storage assembly positioned within the vapor chamber,
    wherein the vapor chamber comprises a working fluid therein,
    wherein the thermal energy storage assembly comprises:
        a reservoir wall extending to a leading edge of the energy storage assembly; and
        a phase change material encased within the reservoir wall such that the phase change material is fluidly isolated from the working fluid, and
    wherein the vapor chamber extends between the leading edge of the outer wall and the leading edge of the energy storage assembly.

18. The leading edge assembly of claim 17, wherein the phase change material comprises silicon or beryllium.

* * * * *